United States Patent
Sharma et al.

(10) Patent No.: US 8,024,432 B1
(45) Date of Patent: Sep. 20, 2011

(54) METHOD AND APPARATUS FOR PARTITIONING A COMPUTER CLUSTER THROUGH COORDINATION POINT DEVICES

(75) Inventors: Sumit Sharma, Pune (IN); Amol Shivram Katkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 268 days.

(21) Appl. No.: 12/147,764

(22) Filed: Jun. 27, 2008

(51) Int. Cl.
*G06F 15/177* (2006.01)
(52) U.S. Cl. .......... 709/220; 709/224; 709/203; 714/4.1
(58) Field of Classification Search .......... 709/223–224, 709/220, 203, 209; 714/4, 4.1, 4.11
See application file for complete search history.

(56) References Cited

U.S. PATENT DOCUMENTS

| | | | | |
|---|---|---|---|---|
| 6,279,032 B1 * | 8/2001 | Short et al. | | 709/209 |
| 6,662,219 B1 * | 12/2003 | Nishanov et al. | | 709/220 |
| 6,862,613 B1 * | 3/2005 | Kumar et al. | | 709/220 |
| 6,950,833 B2 * | 9/2005 | Costello et al. | | 709/226 |
| 7,127,633 B1 * | 10/2006 | Olson et al. | | 714/4 |
| 7,478,263 B1 * | 1/2009 | Kownacki et al. | | 714/4 |
| 2002/0042693 A1 * | 4/2002 | Kampe et al. | | 702/186 |
| 2006/0168192 A1 * | 7/2006 | Sharma et al. | | 709/224 |
| 2008/0184061 A1 * | 7/2008 | Tripathi et al. | | 714/4 |

OTHER PUBLICATIONS

"HP Serviceguard Quorum Server Version A.02.00 Release Notes, Fifth Edition," Manufacturing Part No. B8467-90036, Feb. 2007, pp. 1-28.

* cited by examiner

*Primary Examiner* — Philip B Tran
(74) *Attorney, Agent, or Firm* — Campbell Stephenson LLP

(57) ABSTRACT

A method and apparatus for partitioning a computer cluster through coordination point devices that provide enhanced split brain arbitration during I/O fencing. In one embodiment, a method for using coordination point devices to support Input/Output fencing in a computer cluster comprises processing at least one arbitration request from at least one client computer upon an occurrence of a split brain within a computer cluster, wherein each arbitration request indicates at least one established connection between at least one coordination point device and each client computer of the at least one client computer and each client sub-cluster membership, wherein the at least one coordination point device form a coordination point cluster membership and selecting a client computer of the at least one client computer to continue to be a portion of the computer cluster based on the arbitration request.

15 Claims, 5 Drawing Sheets

METHOD AND APPARATUS FOR PARTITIONING A COMPUTER CLUSTER THROUGH COORDINATION POINT DEVICES

BACKGROUND OF THE INVENTION

1. Field of the Invention

Embodiments of the present invention generally relate to a computer clusters. More particularly, embodiments of the present invention relate to a method and apparatus for efficiently handling a network partition of a computer cluster using coordination point devices to enhance split brain arbitration.

2. Description of the Related Art

A computer cluster is a configuration that comprises a plurality of computers (e.g., server computers, client computers and/or the like) as well as various cluster resources (e.g., applications, services, file systems, storage resources, processing resources, networking resources and/or the like). The various cluster resources may be managed through one or more service groups. Occasionally, the computer cluster must handle one or more split brain scenarios amongst the various cluster resources.

Generally, a split brain occurs when two independent systems (e.g., one or more computers and a portion of the various cluster resources) configured in the computer cluster assume exclusive access to a particular cluster resource (e.g., a file system or volume). The most serious problem caused by the network partition is the affect on the data stored in the shared storage (e.g., disks). Typical failover management software uses a predefined method (e.g., heartbeats) to determine if a node is "alive". If the node is alive, the system recognizes that the portion of the cluster resources cannot be safely taken over or controlled. Therefore, multiple systems are online and have access to an exclusive cluster resource simultaneously, which causes numerous problems such as data corruption, data inconsistency and malicious attacks.

Hence, the split brain occurs when the predefined method to determine node failure is compromised.

The methodology of avoiding and/or mitigating split brain scenarios within the computer cluster is Input/Output (I/O) Fencing. I/O fencing may also be known as disk fencing or failure fencing. When a computer cluster node fails, the failed node needs to be fenced off from the cluster resources (e.g., shared disk devices, disk groups or volumes). The main function of I/O fencing includes preventing updates by failed instances and split brains in cluster. I/O fencing may be executed by the VERITAS Cluster Volume Manager (CVM) in association with a shared storage unit. Furthermore, VERITAS Cluster File System (CFS) plays a significant role in preventing the failed nodes from accessing shared cluster resources (e.g., shared devices).

For example, in a SUN computer cluster, I/O fencing is done through Small Computer System Interface-2 (SCSI-2) Reservation for dual hosted SCSI devices and SCSI-3 PR for a multi-hosted SCSI environment. VERITAS Advance Cluster uses the SCSI-3 persistent reservation (PR) to perform I/O fencing. In the case of LINUX clusters, the CFS (e.g., POLYSERVE and SISTINA Global File System (GFS)) are employed to perform I/O fencing by using different methods such as fabric fencing, which uses Storage Area Network (SAN) access control mechanisms. SCSI-2 Reservation and SCSI-3 Persistent Reservation are inefficient and limited in various respects. SCSI-2 Reservation is not persistent and SCSI-3 PR is limited to one computer cluster for arbitration. Furthermore, SCSI-3 PR in Campus Clusters requires a third coordinator disk to be placed on a third site, which requires expensive SAN infrastructure on the third site.

Alternatively, coordination point devices (e.g., servers) may perform I/O fencing without the above limitations for SCSI-3 PR. Generally, the coordination point devices use an arbitration technique to determine which computer cluster node to fence from the cluster resources. Unfortunately, the coordination point devices are unable to handle scenarios where the coordination point device fails or is inaccessible (e.g., cannot connect with a client computer). Furthermore, the coordination point devices may choose a smaller sub-cluster of nodes to survive over a larger sub-cluster of nodes simply because the smaller sub-cluster started an arbitration race before the larger sub-cluster. Hence, an arbitration request initiated by the smaller sub-cluster reaches the coordination point server before the larger sub-cluster arbitration request.

Therefore, there is a need in the art for a method and apparatus for partitioning a computer cluster through coordination point devices that provide enhanced split brain arbitration during I/O fencing.

SUMMARY OF THE INVENTION

Embodiments of the present invention, generally, relate to a method and apparatus for partitioning a computer cluster through coordination point devices that provide enhanced split brain arbitration during I/O fencing. In one embodiment, the method comprises processing at least one arbitration request from at least one client computer upon an occurrence of a split brain within a computer cluster, wherein each arbitration request indicates at least one established connection between at least one coordination point device and each client computer of the at least one client computer and each client sub-cluster membership, wherein the at least one coordination point device form a coordination point cluster membership and selecting a client computer of the at least one client computer to continue to be a portion of the computer cluster based on the arbitration request.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
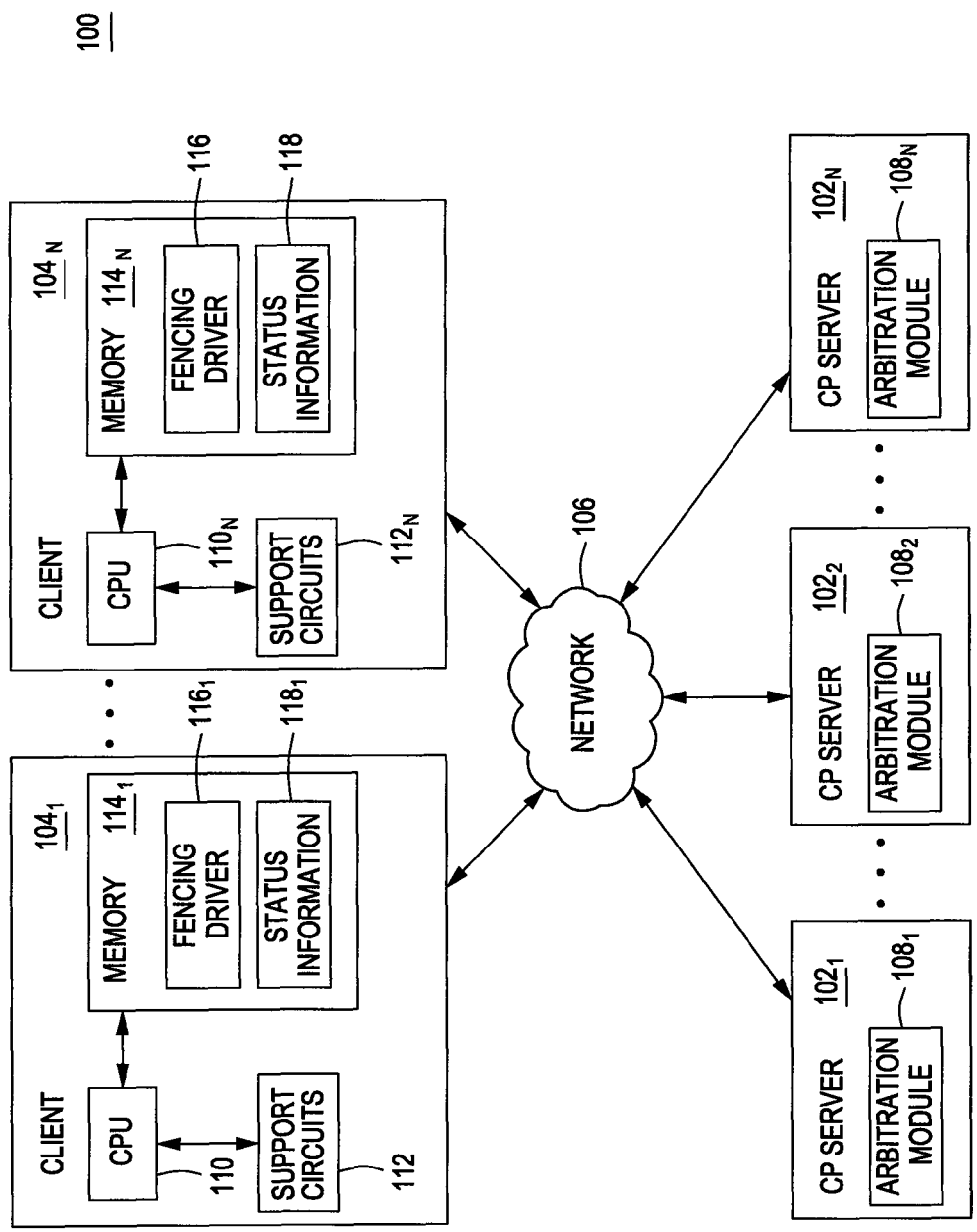
FIG. 1 is a block diagram of a system for partitioning a computer cluster through coordination point devices according to one or more embodiments.

FIG. 1 is a system 100 for performing a computer cluster network partition through one or more coordination point devices according to one embodiment. The one or more coordination point (CP) devices provide enhanced split brain arbitration to facilitate Input/Output (I/O) fencing between two or more sub-clusters in a computer cluster. The system 100 includes one or more coordination point (CP) devices 102 (i.e., a CP cluster) and one or more clients 104 (i.e., a client cluster) where each is coupled to each other through a network 106. The CP devices 102 may be illustrated in FIG. 1 as a CP device $102_1$, a CP device $102_2$ ... a CP device $102_N$. The clients 104 may be illustrated in FIG. 1 as a client $104_1$ ... a client $104_N$.

The CP devices 102 are sometimes referred to as "dumb" computing devices that provide split brain arbitration in order to implement an I/O fencing technique, which separates two or more sub-clusters within the computer cluster (e.g., separates a sub-cluster from remaining sub-clusters). The CP devices 102 provide a particular sub-cluster with exclusive access to a service group. Generally, service groups comprise one or more portions of various cluster resources and services (e.g., storage devices, networking components, processors, virtual machines, file systems, disk groups, volumes, and/or the like) for managing and implementing a software application (e.g., a database application).

The clients 104 are computing devices (e.g., laptops, desktops, Personal Desk Assistants (PDA), tablets, mobile phones and the like) where each comprises a central processing unit (CPU) 110, various support circuits 112 and a memory 114. The CPU 110 may comprise one or more commercially available microprocessors or microcontrollers that facilitate data processing and storage. Various support circuits 112 facilitate operation of the CPU 110 and may include clock circuits, buses, power supplies, input/output circuits and/or the like. The memory 114 includes a read only memory, random access memory, disk drive storage, optical storage, removable storage, and the like. The memory 114 includes various software packages, such as a fencing driver 116. The memory 114 further includes various data, such as status information 118.

The network 106 comprises a communication system that connects computers by wire, cable, fiber optic, and/or wireless links facilitated by various types of well-known network elements, such as hubs, switches, routers, and the like. The network 106 may employ various well-known protocols to communicate information amongst the network resources. For example, the network 106 may be part of the Internet or intranet using various communications infrastructure such as Ethernet, WiFi, WiMax, General Packet Radio Service (GPRS), and the like.

Each of the CP devices 102 comprises an arbitration module 108. The arbitration module 108 comprises software code for performing the split brain arbitration to support the I/O fencing decisions (i.e., races). In one embodiment, the arbitration module 108 processes one or more requests (e.g., vote requests) from at least one of the clients 104 within the computer cluster (e.g., the client cluster). Subsequently, the arbitration module 108 analyzes the one or more requests to determine a particular client computer to receive a response (e.g., a vote). In one embodiment, the CP device may decide to send such a response to the particular client computer that is a member of a largest sub-cluster. Basically, the CP device decides to vote for the particular client computer (i.e., the client cluster) to remain in the computer cluster in order to retain as many nodes as possible. Hence, the response (e.g., vote) comprises information indicating that the particular client computer is most likely to win the I/O fencing decision (i.e., split brain arbitration) and remain a member of the computer cluster.

The fencing driver 116 comprises software code for performing a portion (e.g., a client component) of the I/O fencing decision. The fencing driver 116 is configured to communicate one or more requests (e.g., vote request) to the CP devices 102. In one embodiment, the fencing driver 116 sends a request to a first CP device (e.g., CP device $102_1$, CP device $102_2$ or any other CP device that establishes a connection with the client 104). In one embodiment, the first CP device has a lowest node number amongst one or more CP devices that are accessible to the client 104. The fencing driver 116 may be also configured to receive one or more responses (e.g., votes) from one or more CP devices of the CP devices 102. Based on the one or more responses, the fencing driver 116 determines whether the client 104 won the I/O fencing decision. For example, if a number of total votes including proxy votes exceeds half of a number of CP devices originally configured in the computer cluster.

The status information 118 comprises data indicating one or more sub-clusters (e.g., groups of client computers) within the computer cluster. In one embodiment, the status information 118 includes a CP cluster membership and a client cluster membership of each client of the clients 104. The CP cluster membership indicates one or more CP devices that are accessible to the client 104. In one embodiment, a CP device of the CP devices 102 that failed or is configured in the computer cluster but not included within the CP cluster membership is not accessible to the client 104. As explained further below, a CP device of the CP devices 102 that receives the status information 118 may issue a response to the client 104 that includes a vote from such a CP device as well as a proxy vote on behalf of the inaccessible CP device to provide split brain arbitration despite a failure or a lack of connectivity at the inaccessible CP device.

Moreover, the client cluster membership may indicate one or more client computers are connected to the client 104 in a sub-cluster (i.e., client cluster). The client cluster membership may also indicate that the client 104 is not connected to any client computer; hence, a lone member of the sub-cluster. As such, the client cluster membership indicates a size of the sub-cluster. The status information 118 may be represented in a notation of (<CP cluster membership>, <client cluster membership>). In one embodiment, the CP cluster membership and/or the client cluster membership may be presented in order of node number.

According to various embodiments of the present invention, the CP devices 102 cooperate with each other to facilitate I/O fencing amongst the clients 104 within the computer cluster. In one embodiment, the CP devices 102 perform split brain arbitration to determine whether a particular client computer is to remain a member of the computer cluster or is to be separated from the computer cluster. If the CP devices 102 decide that the particular client computer is to be separated, the particular client computer is fenced off from the service groups hosted by the computer cluster (e.g., prevented from accessing various cluster resources, such as a file system, a disk group or a database).

In operation, the CP devices 102 process one or more arbitration requests and communicate one or more responses to the clients 104 for I/O fencing decisions (e.g., split brain arbitrations). The one or more responses are processed to determine which of the clients 104 are to remain a member of the computer cluster (e.g., win the I/O fencing decision (race)) or be fenced off (e.g., commit suicide). In another embodiment, the CP devices 102 examine the status information 118 to select a particular sub-cluster to survive the I/O fencing. In yet another embodiment, a policy is used to determine a client computer to select as a winner of the I/O fencing decision. For example, the CP devices 102 may compare timestamps associated with the one or more arbitration requests and vote for a particular client with an earliest timestamp member (i.e., a member of the particular sub-cluster). Consequently, any client that is not a member of the particular sub-cluster is to commit suicide. The one or more responses may include one or more votes from one or more accessible CP devices as well as one or more proxy votes on behalf of one or more failed or inaccessible CP devices as indicated in a CP cluster membership portion of the status information 118.

In one embodiment of the present invention, the system 100 may be an N-node computer cluster that includes the clients 104 as well as an odd number of CP devices 102. For example, the N-node cluster may be a two-node computer cluster that includes a first client computer ("C-1") and a second client computer ("C-2"). Furthermore, the two-node computer cluster comprises a first CP device ("CPS-1"), a second CP device ("CPS-2") and a third CP device ("CPS-3") for providing split brain arbitration for the first client computer and the second client computer.

The first client computer and the second client computer initiate a process to establish a connection within the first CP device, the second CP device and the third CP device. At the time of establishing connection with each CP device, the first client computer and the second client computer indicate one or more CP devices that are to be used as a coordination point. If, at the time of establishing connection, the first client computer and/or the second client computer cannot connect to any one of CP devices indicated in a configuration file, the first client computer and/or the second client computer fail to start. If the first client computer and/or the second client computer lose or drop a connection with a particular CP device after the client cluster is in function, a node number for the particular CP device is stored in status information. For example, the status information for the first client computer may be represented as (CPS-1: CPS-3, C-1: C-2) if the first client computer is able to establish a connection with the first CP device and the third CP device but not the second CP device while the client cluster is in operation.

Subsequently, a split brain occurs within the computer cluster and the first client computer and the second client computer are no longer connected with each other. Hence, the first client computer is a member of a first sub-cluster and the second client computer is a member of a second sub-cluster. The status information for the first client computer may be represented as (CPS-1: CPS-3, C-1) and the status information for the second client computer may be represented as (CPS-1: CPS-2: CPS-3, C-2). The first client computer and the second client computer race to each CP device with an established connection but are limited to a stable timeout (e.g., a time period) to send an arbitration request.

In one embodiment, the first client computer and the second client computer are connected to each other as well as the first CP device, the second CP device and the third CP device. The first CP device, the second CP device and the third CP device are all running and accessible (e.g., no failure). The status information indicates that the first CP device, the second CP device and the third CP device share a CP cluster membership in a perspective of either the first client computer or the second client computer. After the split brain occurs within the computer cluster, the status information may indicate that the first client computer and the second client computer are each sole members of the first sub-cluster and the second sub-cluster. In one embodiment, such status information is represented as (CPS-1: CPS-2: CPS-3, C-1) for the first client computer and (CPS-1: CPS-2: CPS-3, C-2) for the second client computer. According to one embodiment, the status information may be received by the first CP device, the second CP device and the third CP device in that particular order. For example, the status information for the first client computer and the second client computer is sent to the first CP device in the form of arbitration requests. If the status information is not provided in the arbitration requests, the I/O fencing race would lead to a complete shutdown of the computer cluster.

According to one embodiment, a policy may be used to determine a particular client computer to which a particular CP device provides a vote for the I/O fencing race. In one implementation of such a policy, the particular client computer may be determined based on a client cluster size, a CP cluster size and/or an earlier request time. As an example of such an implementation, the status information is analyzed to determine a first sub-cluster size for the first client computer and a second sub-cluster size for the second client computer. The first sub-cluster size is compared with the second sub-cluster size. In one embodiment, a client computer having a largest sub-cluster (e.g., greatest sub-cluster size) is selected to receive a vote for an I/O fencing decision.

If, however, the first sub-cluster size is equal to the second sub-cluster size, then the status information is analyzed to determine a first CP cluster membership size and a second CP cluster membership size. The first CP cluster membership includes information identifying members of a CP cluster (e.g., CP devices that are accessible to the first client computer)). The first CP cluster membership size is compared with a second CP membership size. In one embodiment, a client computer having a largest CP cluster membership is selected to receive the vote for the I/O fencing decision.

If, however, the first CP cluster membership size is equal to the second CP cluster membership size, then the status information is analyzed to determine a first client arbitration request time (e.g., a timestamp indicating a time that the first client computer made the arbitration request to the first CP device) and a second client arbitration request time (e.g., a timestamp indicating a time that the second client computer made the arbitration request to the first CP device). In one embodiment, a client computer having an earliest arbitration request time is selected to receive a vote for the I/O fencing decision. The embodiments mentioned above provide a preference for the larger sub-cluster over the smaller sub-cluster.

Alternatively, the first CP device, the second CP device and/or the third CP device may be failed or inaccessible. According to one embodiment, the status information may be further analyzed to determine whether the selected client computer is to receive a proxy vote on behalf of any failed (i.e., down or inaccessible) CP device. In one embodiment, the selected client computer may be provided with two proxy votes if the second CP device and the third CP device are down, the first sub-cluster and the second sub-cluster are able to connect with the first CP device and the first client CP cluster membership is equivalent to the second client CP cluster membership. As a result, the first CP device provides the selected client computer (i.e., sub-cluster) with one vote and two proxy votes on behalf of the second CP device and the third CP device. The selected client computer has received three votes, which is more than half of the number of CP devices configured in the computer cluster. Furthermore, the first CP device is required to be a lowest numbered CP device.

As another example, if the second CP device is down and the first CP device and the third CP device are accessible to the first client computer and the second client computer (e.g., equivalent CP cluster memberships), the first CP device is to provide the selected client computer with one vote (i.e., on behalf of itself) and one proxy vote on behalf of the second CP device. Subsequently, the third CP device provides the selected client computer with a vote. Since the third CP device is not the lowest numbered CP device, the third CP device does not provide a proxy vote. As a result, the selected client computer has three votes, which is more than half of a number of CP devices configured in the computer cluster (i.e., three CP devices). Therefore, the selected client computer won the I/O fencing decision and is to remain a member of the computer cluster along with exclusive access to one or more service groups that comprises various cluster resources (e.g., a file system).

As another example, if the first client computer is connected with the first CP device and the second CP device and the second client computer is connected with the second CP device and the third CP device. After a split-brain, the status information for the first client computer may be represented as (CPS-1; CPS-2, C-1) and the status information for the first client computer may be represented as (CPS-2; CPS-3, C-2). Subsequently, the first CP device receives an arbitration request from the first client computer but not the second client computer within the stable timeout. As a result, the first CP device provides a vote for the first client computer. Then, the second CP device receives an arbitration request from the first client computer and the second client computer. The second CP device performs a split brain arbitration and selects a client computer to vote to win (i.e., survive) the I/O fencing race. In one embodiment, the second CP device may vote for a largest sub-cluster to survive. Finally, the third CP device receives an arbitration request from the second client computer but not the first client computer. The third CP device provides a vote to the second client computer. Consequently, the first client computer wins the I/O fencing race if selected by the second CP device during the split brain arbitration. Conversely, the second client computer wins the I/O fencing race if selected by the second CP device.

Figure 2:
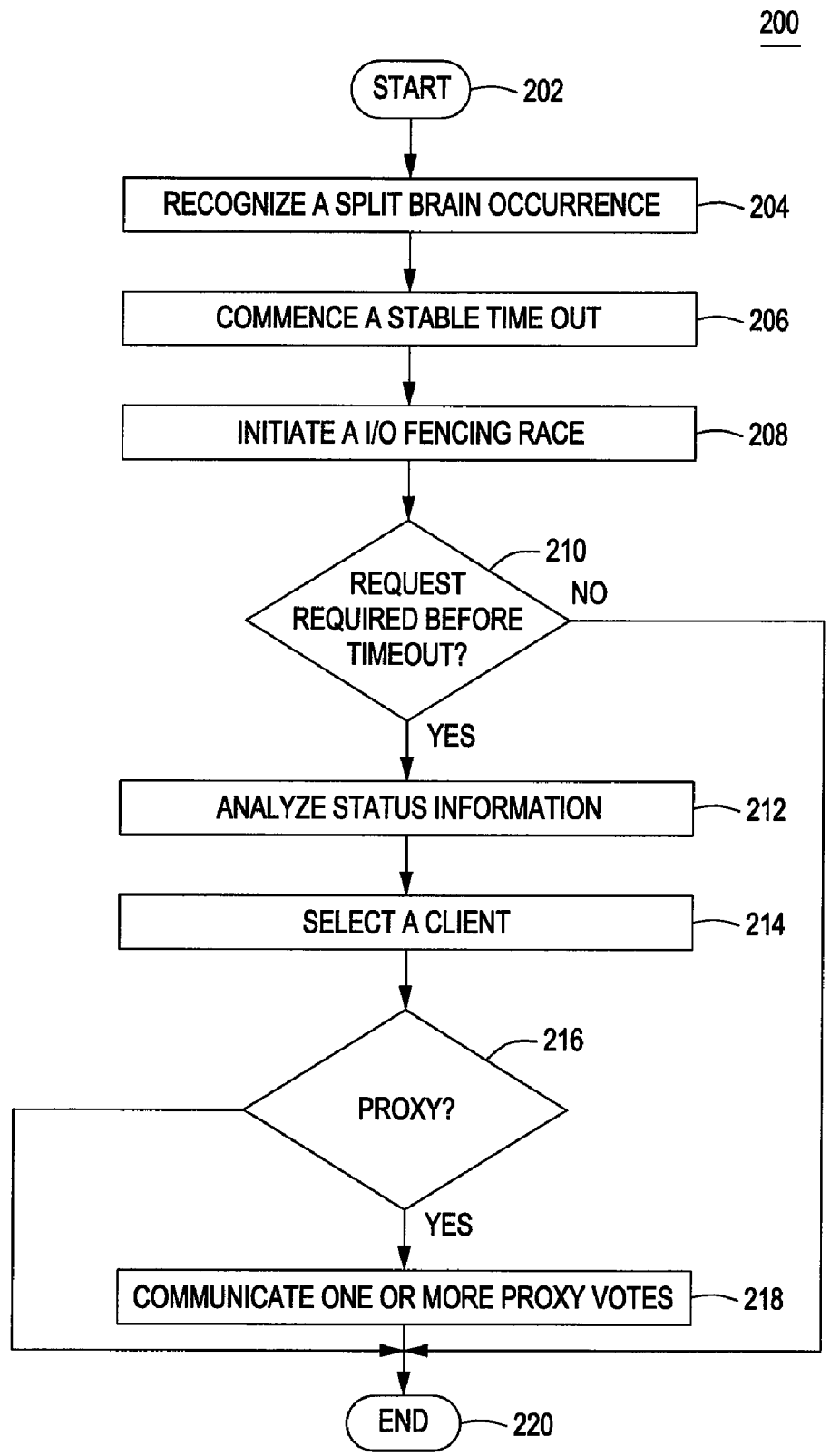
FIG. 2 is a flow diagram of a method for selecting a client to survive an I/O fencing racing according to one or more embodiments.

FIG. 2 is a flow diagram of a method for selecting a client to survive an I/O fencing racing according to one or more embodiments. The method 200 begins at step 202 and proceeds to step 204.

At step 204, a split brain occurrence is recognized. At step 206, a stable timeout is commenced. At step 208, an I/O fencing race is initiated. In one or more embodiments, steps 206 and 208 are performed simultaneously. At step 210, a determination is made as to whether one or more arbitration requests were received before the stable timeout elapsed. If it is determined that the one or more arbitration requests were received before the stable timeout elapsed, the method 200 proceeds to step 212. If it is determined that no arbitration request was received before the stable timeout elapsed, the method 200 proceeds to step 220.

At step 212, status information is analyzed. At step 214, a client (e.g., a sub-cluster) is selected to survive the I/O fencing race. In one embodiment, the selected client is provided with a vote. At step 216, a determination is made as to whether one or more proxy votes are to be communicated to the selected client. If it is determined that one or more proxy votes are to be communicated to the selected client, the method 200 proceeds to step 218. If it is determined that no proxy vote is to be communicated to the selected client, the method 200 proceeds to step 220. At step 218, one or more proxy votes are communicated to the selected client. At step 220, the method 200 ends.

Figure 3:
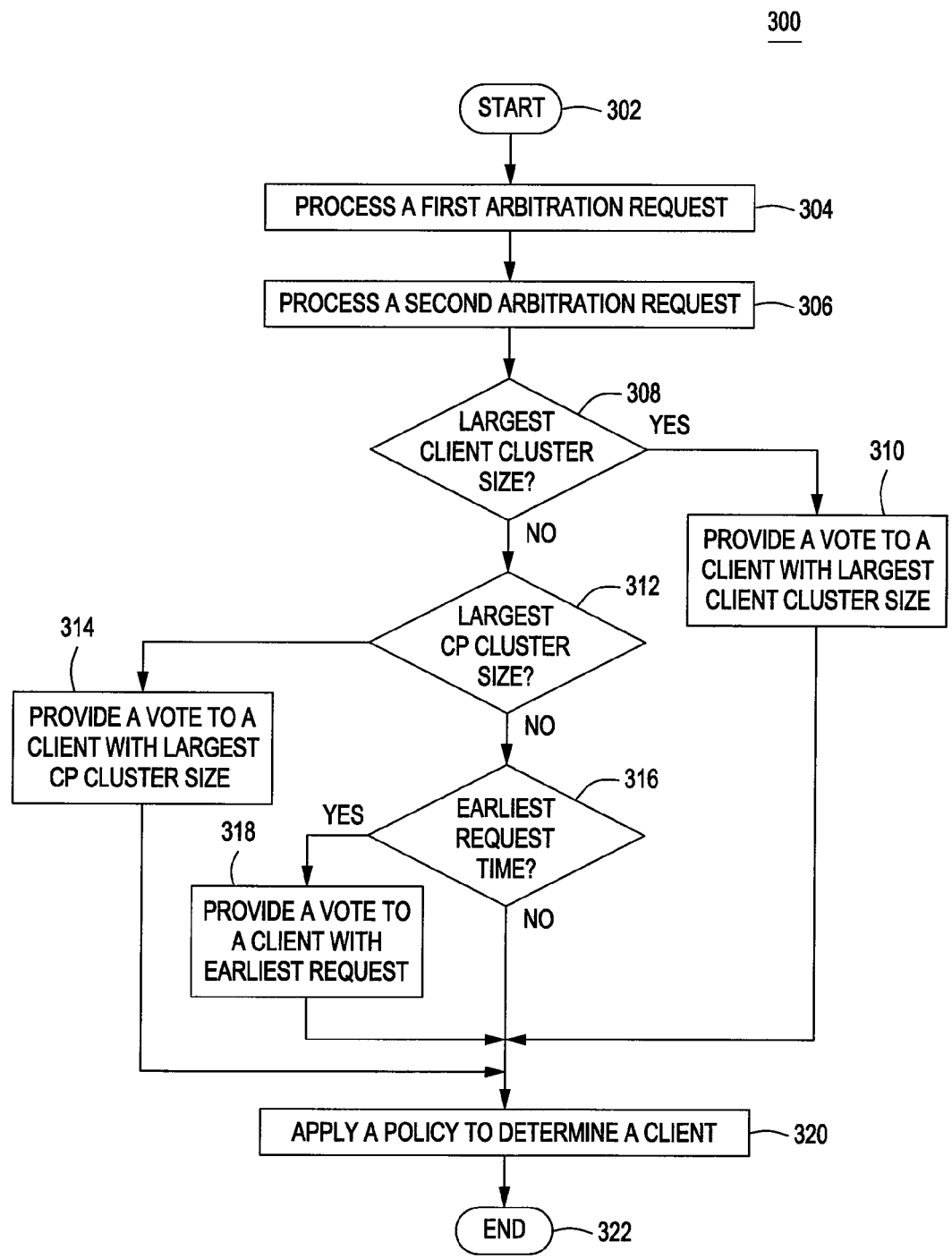
FIG. 3 is a flow diagram of a method for performing a split brain arbitration according to one or more embodiments.

FIG. 3 is a flow diagram of a method 300 for performing split brain arbitration according to one or more embodiments. The embodiments of the present invention include various methods for performing the split-brain arbitration within a computer cluster. As described above, a CP device may use one or more implementations of a policy to determine a client computer for which to provide a vote. Therefore, it is appreciated that one or more embodiments of the present invention may employ different policies. Accordingly, the method 300 may represent an example of an application of a particular policy during an analysis of one or more arbitration requests at the CP device.

The method 300 begins at step 302 and proceeds to step 304. At step 304, a first arbitration request is processed. At step 306, a second arbitration request is processed. At step 308, a determination is made as to whether a client (e.g., sub-cluster) has a largest client cluster size in a computer cluster. If it is determined that there is a client has a largest client cluster size, the method 300 proceeds to step 310. At step 310, a vote is provided to the client with the largest client cluster size. If it is determined that no client has a largest client cluster size, the method 300 proceeds to step 312.

At step 312, a determination is made as to whether a client (e.g., sub-cluster) has a largest CP cluster size in the computer cluster. If it is determined that there is a client has a largest CP cluster size, the method 300 proceeds to step 314. At step 314, a vote is provided to the client with the largest client CP size. If it is determined that no client has a largest CP cluster size, the method 300 proceeds to step 316.

At step 316, a determination is made as to whether a client (e.g., sub-cluster) has an earliest request time. If it is determined that there is a client has an earliest request time, the method 300 proceeds to step 318. At step 318, a vote is provided to the client with the earliest request time. If it is determined that no client has an earliest request time, the method 300 proceeds to step 320. At step 320, a policy is applied to the arbitration requests to determine a client to provide a vote. At step 322, the method 300 ends.

Figure 4:
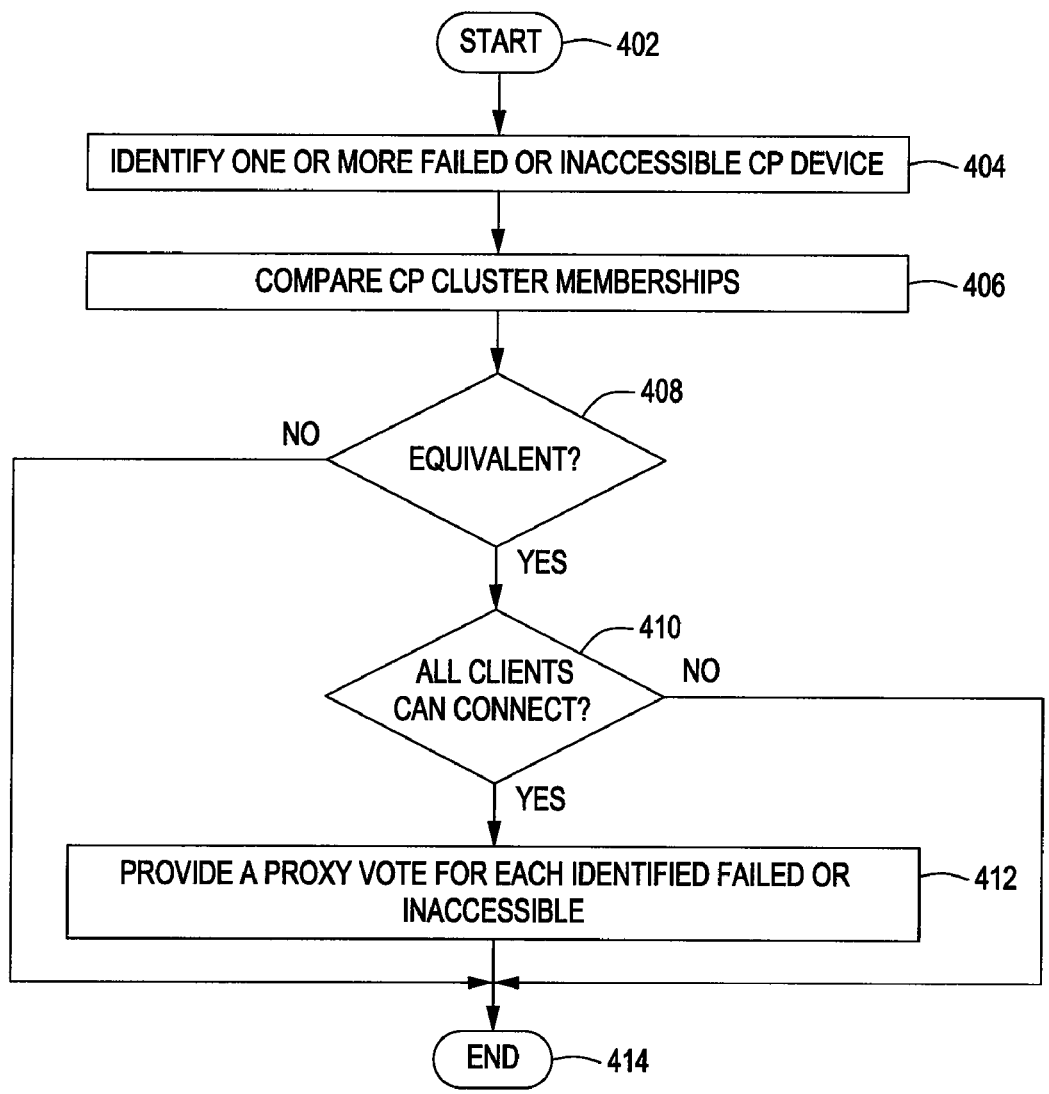
FIG. 4 is a flow diagram of a method for providing one or more proxy votes during a split brain arbitration according to one or more embodiments.

FIG. 4 is a flow diagram of a method for providing one or more proxy votes during split brain arbitration according to one or more embodiments. The method 400 begins at step 402 and proceeds to step 404. At step 404, one or more failed or inaccessible coordination point (CP) devices are identified (e.g., from status information published by one or more client computers).

At step 406, CP cluster memberships of two or more sub-clusters are compared. At step 408, a determination is made as to whether the CP cluster memberships are equivalent (i.e., connected to the same CP devices). If it is determined that there is the CP cluster memberships are equivalent, the method 400 proceeds to step 410. If it is determined that there the CP cluster memberships are different, the method 400 proceeds to step 414. At step 410, a determination is made as to whether each and every client of a particular sub-cluster (e.g., a sub-cluster that received a vote) connected with a CP device. At step 412, a proxy vote is provided to the particular sub-cluster for each identified failed or inaccessible CP device. At step 414, the method 400 ends.

Figure 5:
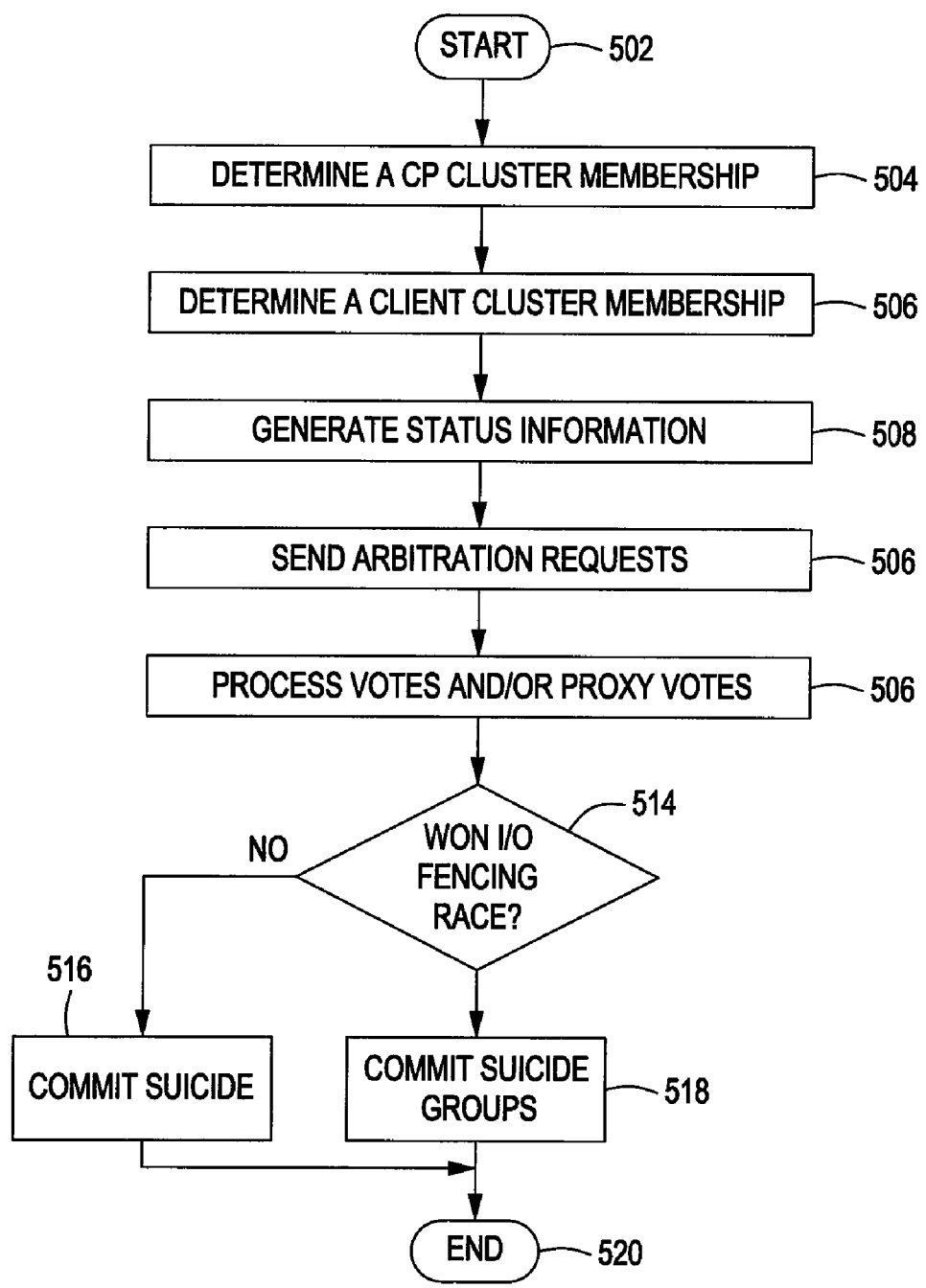
FIG. 5 is a flow diagram of a method for partitioning a computer cluster through coordination point devices according to one embodiment.

FIG. 5 is a flow diagram of a method 500 for partitioning a computer cluster through coordination point devices according to one embodiment. The method 500 begins at step 502 and proceeds to step 504.

At step 504, a CP cluster membership of a client is determined. At step 506, a client cluster membership of the client is determined. At step 508, status information is generated at the client. At step 510, one or more arbitration requests are sent to one or more CP devices. At step 512, one or more votes and/or one or more proxy votes are processed at the client.

At step 514, a determination is made as to whether the client won the I/O fencing race. If it is determined that the client did not win the I/O fencing decision, the method 500 proceeds to step 516. At step 516, the client commits suicide. If it is determined that the client won the I/O fencing decision, the method 500 proceeds to step 518. As explained above, a particular client won an I/O fencing race if a total number of votes at the particular client is more than half of a number of CP devices configured in a computer cluster. At step 518, one or more services groups are accessed by the client. At step 520, the method 500 ends.

While the foregoing is directed to embodiments of the present invention, other and further embodiments of the invention may be devised without departing from the basic scope thereof, and the scope thereof is determined by the claims that follow.

The invention claimed is:

1. A method comprising:
   receiving an arbitration request from a client computer upon an occurrence of a cluster partition, wherein the cluster partition partitions a computer cluster into a plurality of sub-clusters, wherein a first sub-cluster of the plurality of sub-clusters comprises the client computer wherein the arbitration request indicates which of a plurality of coordination point devices the client computer is connected to and which of a plurality of client computers are included in the first sub-cluster;
   comparing a coordination point cluster membership of the first sub-cluster of the plurality of sub-clusters and a second coordination point cluster membership of a second sub-cluster of the plurality of sub-clusters;
   selecting, based on the arbitration request, to vote for the client computer to continue to be a member of the computer cluster;
   identifying a failed coordination point device of the plurality of coordination point devices; and
   communicating, to the client computer, the vote and a proxy vote for the failed coordination point device.

2. The method of claim 1, wherein the vote is associated with an Input/Output fencing decision.

3. The method of claim 1, wherein the vote identifies a client sub-cluster that comprises the selected client computer to survive an Input/Output fencing decision.

4. The method of claim 3, wherein the client sub-cluster receives a number of votes that exceeds one-half of a number of configured coordination point devices in the computer cluster.

5. The method of claim 1, further comprising: determining at least one coordination point server that is not communicable with the client computer.

6. The method of claim 1, wherein the vote further comprises the proxy vote for at least one failed coordination point device.

7. The method of claim 1, wherein the selecting is performed in accordance with a policy, wherein the policy is used to determine a best client computer to provide the vote.

8. The method of claim 1, further comprising communicating a plurality of votes to the client computer from an odd number of coordination point devices, wherein the client computer is to remain a member of the computer cluster if the plurality of votes exceeds at least one-half of a number of coordination point devices.

9. The method of claim 1, further comprising: selecting a second client computer that is to be fenced from various cluster resources during the cluster partition.

10. The method of claim 1, further comprising separating a second client computer from the computer cluster, wherein the second client computer is not connected with the client computer.

11. An apparatus comprising:
    an arbitration module for
       receiving an arbitration request from a client computer upon an occurrence of a cluster partition, wherein the cluster partition partitions a computer cluster into a plurality of sub-clusters, wherein a first sub-cluster of the plurality of sub-clusters comprises the client computer, wherein the arbitration request comprises status information indicating which of a plurality of coordination point devices the client computer is connected to and which of a plurality of client computers are included in the first sub-cluster,
       comparing a coordination point cluster membership of the first sub-cluster of the plurality of sub-clusters and a second coordination point cluster membership of a second sub-cluster of the plurality of sub-clusters,
       selecting, based on the arbitration request, to vote for the client computer to continue to be a member of the computer cluster, and
       identifying a failed coordination point device of the plurality of failed coordination point devices;
    a memory comprising the status information; and
    a communicating module for communicating to the client computer a vote and a proxy vote for the failed coordination point device.

12. The apparatus of claim 11, wherein the arbitration module selects the client computer in accordance with a policy, wherein the policy is used to determine a best client computer to provide a vote to remain a member of the computer cluster.

13. A system comprising:
    a client computer;
    a memory comprising status information which indicates which of a plurality of coordination point devices the client computer is connected to and which of a plurality of client computers are included in a first sub-cluster of a plurality of sub-clusters, wherein the first sub-cluster of the plurality of sub-clusters comprises the client computer;
    a fencing driver for communicating an arbitration request and processing a response for the arbitration request to determine an Input/Output fencing decision;
    an odd number of coordination point devices;
    an arbitration module for
       receiving the arbitration request from the client computer upon an occurrence of a cluster partition, wherein the cluster partition partitions a computer cluster into the plurality of sub-clusters,
       comparing a coordination point cluster membership of the first sub-cluster of the plurality of sub-clusters and a second coordination point cluster membership of a second sub-cluster of the plurality of sub-clusters,
       selecting, based on the arbitration request, to vote for the client computer to continue to be a member of the computer cluster, and
       identifying a failed coordination point device of the plurality of failed coordination point devices; and
    a communicating module for communicating to the client computer a vote and a proxy vote for a failed coordination point device.

14. The system of claim 13, wherein the odd number of coordination point devices communicate a plurality of votes to the client computer, wherein the client computer is to remain a member of the computer cluster if the plurality of votes exceeds at least one-half of the odd number of coordination point devices.

15. The system of claim 13, wherein a policy is used to determine a best client computer to provide the vote.

* * * * *